(12) United States Patent
Sandy

(10) Patent No.: US 6,976,820 B2
(45) Date of Patent: Dec. 20, 2005

(54) BED EXTENSION AND STEPGATE PICKUP TRUCK APPARATUS

(76) Inventor: William J. Sandy, 21648 Birch State Park Way, Boca Raton, FL (US) 33428

( * ) Notice: Subject to any disclaimer, the term of this patent is extended or adjusted under 35 U.S.C. 154(b) by 146 days.

(21) Appl. No.: 10/308,351

(22) Filed: Dec. 2, 2002

(65) Prior Publication Data

US 2004/0105745 A1    Jun. 3, 2004

(51) Int. Cl.[7] .............................................. B60R 3/00
(52) U.S. Cl. ...................................... 414/557; 296/62
(58) Field of Search ........................... 414/557; 296/62

(56) References Cited

U.S. PATENT DOCUMENTS

| | | | | |
|---|---|---|---|---|
| 3,637,097 A | * | 1/1972 | Horowitz ..................... | 414/557 |
| 5,118,246 A | * | 6/1992 | Saussard et al. ............ | 414/557 |
| 5,788,311 A | * | 8/1998 | Tibbals ........................ | 296/62 |
| 6,102,646 A | * | 8/2000 | Bass et al. .................. | 414/537 |
| 6,305,897 B1 | * | 10/2001 | Budd et al. ................. | 414/540 |
| 6,558,106 B2 | * | 5/2003 | Sardonico ................... | 414/556 |
| 6,705,825 B2 | * | 3/2004 | Kreutinger .................. | 414/557 |

* cited by examiner

Primary Examiner—Thomas J. Brahan
(74) Attorney, Agent, or Firm—Allen D. Hertz

(57) ABSTRACT

A stepgate that increases the contained storage area of a vehicle and utilizes the tailgate as a stepgate to aid in lifting objects to the storage area of the vehicle. The stepgate adjusts horizontally, whereby this motion allows the stepgate to clear features of the vehicle as well as adjusting the position of an extension platform. The extension platform would adjust horizontally in conjunction with the tailgate to effectively increase the contained storage area of the vehicle. The stepgate, lift feature utilizes the tailgate as the lifting platform. The stepgate is designed where a bracket contacts the ground maintaining the lifting platform slightly above ground level. This allows the integration of the tailgate into the stepgate without subjecting the tailgate to any damage. The design further allows the tailgate to operate, function and remove in the same manner as the original vehicle. Options include removable coupling between the extension platform and the stepgate and extensions for the lifting platform. The stepgate is designed in a manner, which does not change the original appearance of the vehicle.

10 Claims, 10 Drawing Sheets

BED EXTENSION AND STEPGATE PICKUP TRUCK APPARATUS

FIELD OF THE INVENTION

The present invention relates to a stepgate design for a pickup truck, more specifically a stepgate, which provides an extension to the platform of a vehicle, utilizes the tailgate to provide a lifting source for objects, as well as maintaining the aesthetics of the original vehicle.

BACKGROUND OF THE INVENTION

Commonly known liftgate designs utilize a custom lift section that is designed to reside proximate the back end of a truck. These tailgates are designed to abut the trailing edge of the platform of the truck or similar type vehicle. The operating mechanisms for these tailgates are generally coupled to the frame of the vehicle at a distance below the platform of the vehicle resulting in a non-desirable appearance.

Commonly known liftgates are designed whereby the lift section is lowered where the bottom of the lift section contacts the ground. This will scratch the bottom of the lift section. The lift section is generally rotated from a horizontal position to a vertical position, the bottom becoming the visually shown section. This would result in a visually undesirable surface.

Pickup trucks, Sport Utility Vehicles, Sport Utility-Pickup truck Hybrids, and other vehicles with a platform and respective tailgate could benefit from the addition of a means to lift objects towards the platform. The currently known designs would require the replacement of the tailgate. Further, the current designs lower the liftgate whereby the liftgate contacts the ground. This contact can disfigure the liftgate, resulting in a non-desirable appearance.

Commonly known tailgates may include a means for providing a larger lifting platform by the inclusion of a foldable section.

Pickup trucks are commonly used to transport items such as all terrain vehicles (ATV's), motorcycles, bicycles, construction tooling, landscaping equipment and material, and the like.

Common pickup trucks, sport utility vehicles, conversion vehicles, station wagons, and the like, are known to have storage areas that at times may be shorter than desired.

Commonly known liftgates are flat, providing either a horizontal extended platform or a vertical tailgate to the pickup bed, thus the liftgates are limited in that they can not increase the contained dimensions within a pickup truck bed or other storage areas. The contained dimensions would include a horizontal platform and vertical sides.

What is desired is a liftgate design that provides a means to lift objects towards the platform of a vehicle, without changing the aesthetics of the current vehicle. It is further desired to include a means to increase the contained storage area of the vehicle.

SUMMARY OF THE INVENTION

One aspect of the present invention is a stepgate designed in a manner whereby the operating mechanism is substantially hidden under the bed of the vehicle.

A second aspect of the present invention is an apparatus described herein, whereby the apparatus does not change the external appearance or the vehicle. The apparatus comprising a tailgate that resembles a vehicle factory tailgate (either the actual vehicle factory tailgate or a vehicle factory tailgate facsimile).

A third aspect of the present invention is a pickup truck bed extension platform, which adjusts horizontally providing an increased length in the platform of the vehicle.

A forth aspect of the present invention is a pickup truck bed extension platform which increases the contained storage area of the vehicle.

A fifth aspect of the present invention is a stepgate design, whereby the lifting platform is the inner wall of the tailgate of the vehicle.

A sixth aspect of the present invention is a stepgate design that repositions at least one of a bumper and a rear valance of the vehicle.

A seventh aspect of the present invention is the inclusion of a trailer hitch coupled to at least one of the lift gate frame, the lift gate operating mechanism and the bumper of the vehicle which is further enhanced in that the trailer hitch does not have to be removed in order to operate the stepgate.

An eighth aspect of the present invention is a first operating step of the stepgate, whereby the first operating step of the stepgate horizontally adjusts the position of the stepgate and optionally horizontally adjusts the position of a bed extension platform.

A ninth aspect of the present invention is a second operating step of the stepgate, whereby the second operating step of the stepgate vertically adjusts the position of the stepgate.

A tenth aspect of the present invention is a third operating step of the stepgate, whereby the third operating step of the stepgate rests a ground contacting member against the ground.

An eleventh aspect of the present invention is the ability to position the tailgate vertically or horizontally during any of the operating steps of the stepgate.

A twelfth aspect of the present invention is whereby the bed extension platform is removable.

A thirteenth aspect of the present invention is the utilization of the existing pickup truck tailgate as the stepgate. The existing pickup truck tailgate could be described as the vehicle factory tailgate (either the actual vehicle factory tailgate or a vehicle factory tailgate facsimile).

A fourteenth aspect of the present invention is the ability to lock the stepgate operating mechanism into a securing member.

A fifteenth aspect of the present invention is the ability to lock the stepgate operating mechanism into a slide channel.

A sixteenth aspect of the present invention is the ability to include the original tailgate of the vehicle, whereby the original tailgate operates in the original manner.

DETAILED DESCRIPTION OF THE INVENTION

Figure 1:
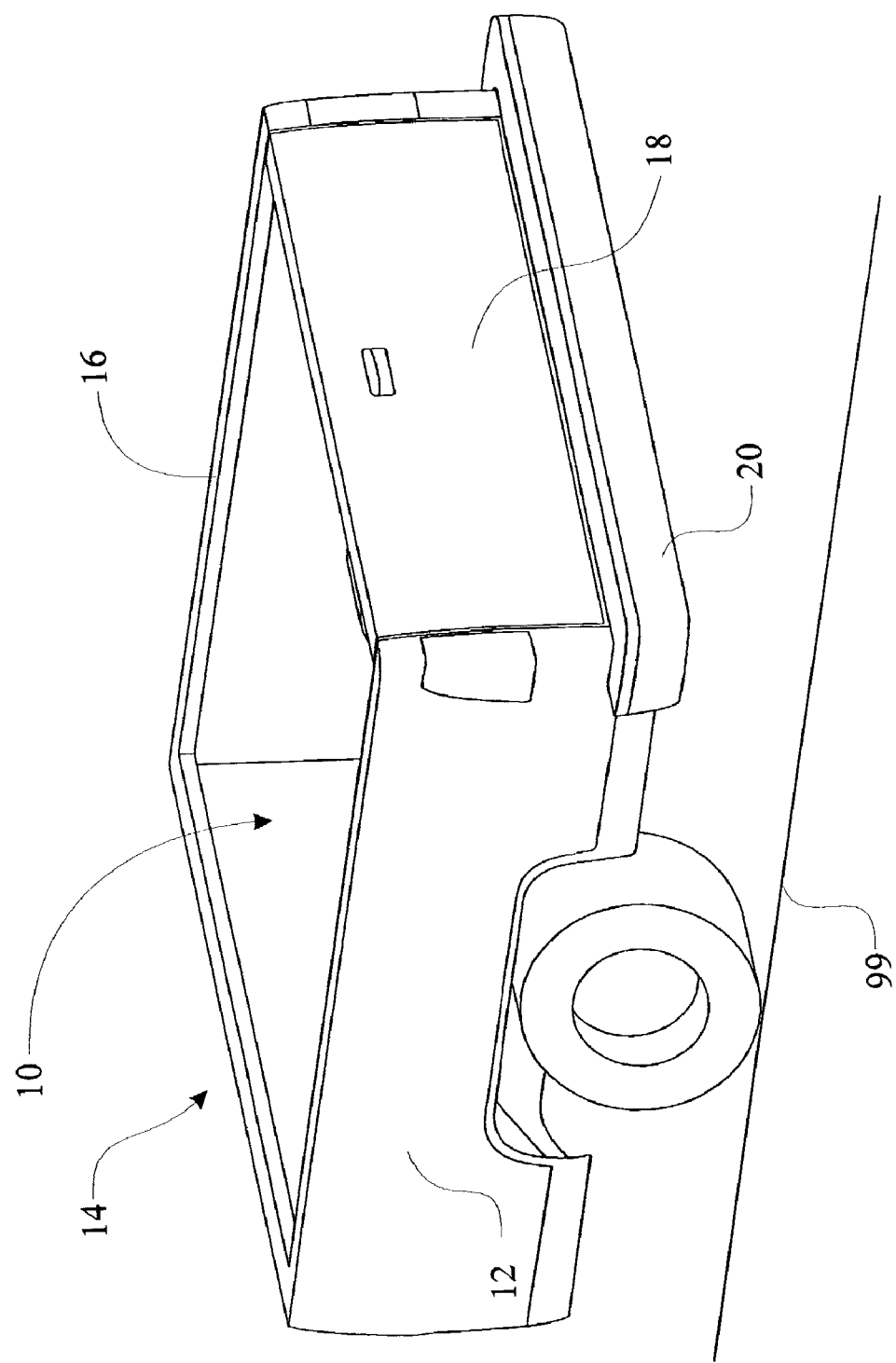
FIG. 1 is an isometric view of a pickup truck bed illustrating the present invention in a fully retracted position.

FIG. 1 is an isometric view of a Pickup truck bed comprising a vehicle storage area 10. The vehicle storage area 10 comprises a contained storage area boundary that is created by two storage area sidewalls 12, a storage area front wall 14, and a vehicle tailgate 18. The vehicle tailgate 18 resembles The actual vehicle factory tailgate or a vehicle factory tailgate facsimile. This refers to a tailgate design that would follow the natural lines of the original vehicle tailgate or a close representation. The vehicle tailgate 18 is shown in a vertical or secured position. A bed rim 18 surrounds the upper edge of the vehicle storage area 10. The view further illustrates a rear bumper 20 that is commonly considered a standard component of a pickup truck or similar vehicle. Alternatively, a rear valance can replace the rear bumper 20. The view includes a reference line illustrative of a ground level representation 99.

Figure 2:
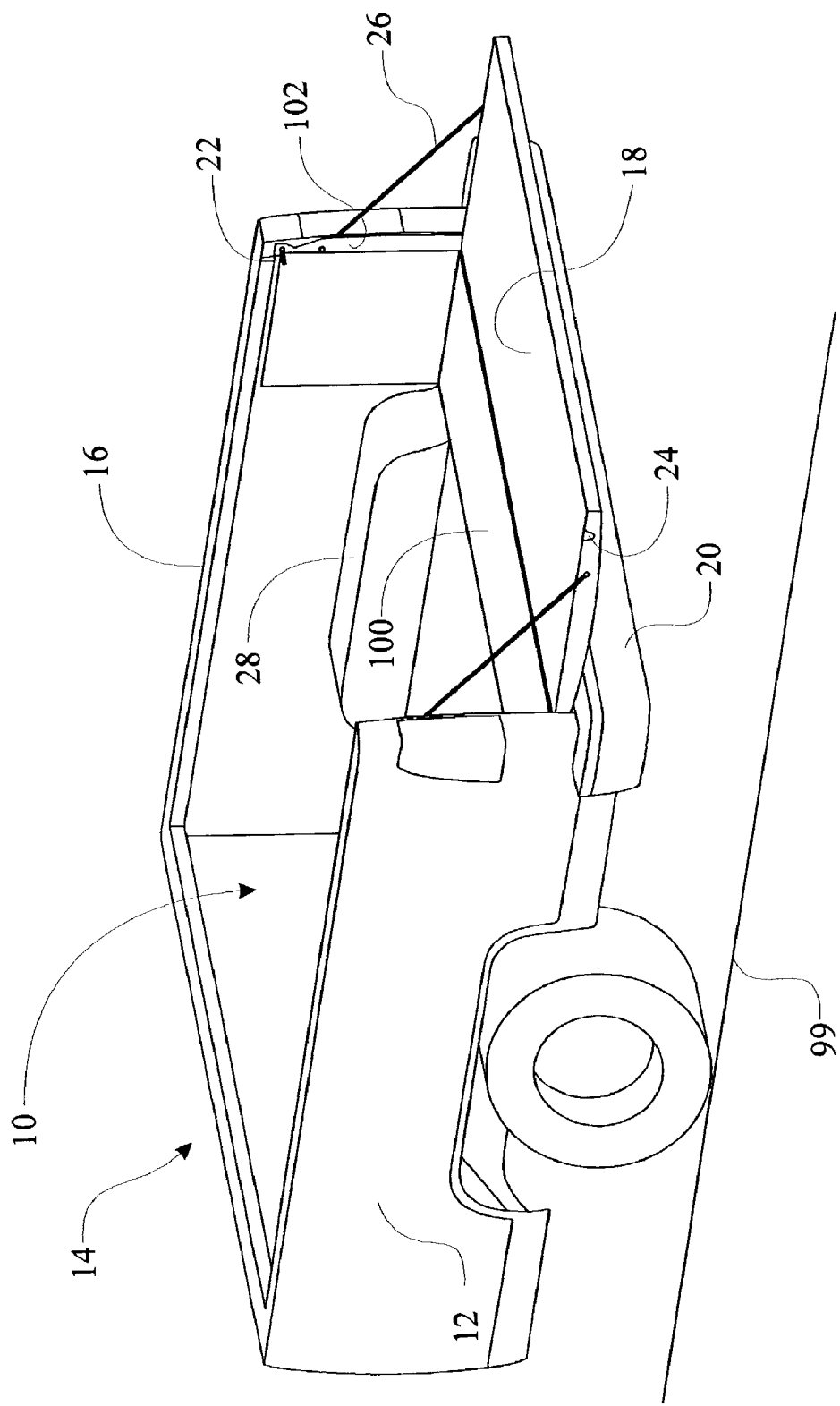
FIG. 2 is an isometric view of the pickup truck bed illustrating the present invention in the fully retracted position with a tailgate in a lowered position.

FIG. 2 is an isometric view of the vehicle storage area 10 illustrating the present invention in a fully retracted position with the vehicle tailgate 18 in a horizontal or lowered position. The vehicle tailgate 18 is hinged to a tailgate operations control post 102. The tailgate operations control post 102 comprises a tailgate latch pin 22 used in conjunction with a tailgate latch 24 coupled to the vehicle tailgate 18 to secure the vehicle tailgate 18 in the vertical position. A first end of a tailgate support cable 26 is coupled to the tailgate operations control post 102 and a second end of the tailgate support cable 26 is coupled to the vehicle tailgate 18. The tailgate operations control post 102 provides support to the vehicle tailgate 18 when the vehicle tailgate 18 is in a horizontal or lowered position. These features replicate the functionality, operation, and installation of the vehicle tailgate 18 to the original specifications of the vehicle. The vehicle tailgate 18 shown in the horizontal or lowered position provides a view of an extension platform 100 in the fully retracted position. The extension platform 100 would preferably include a base and two sides as illustrated. The extension platform 100 can further include a recessed area for clearance around wheel wells 28.

Figure 3:
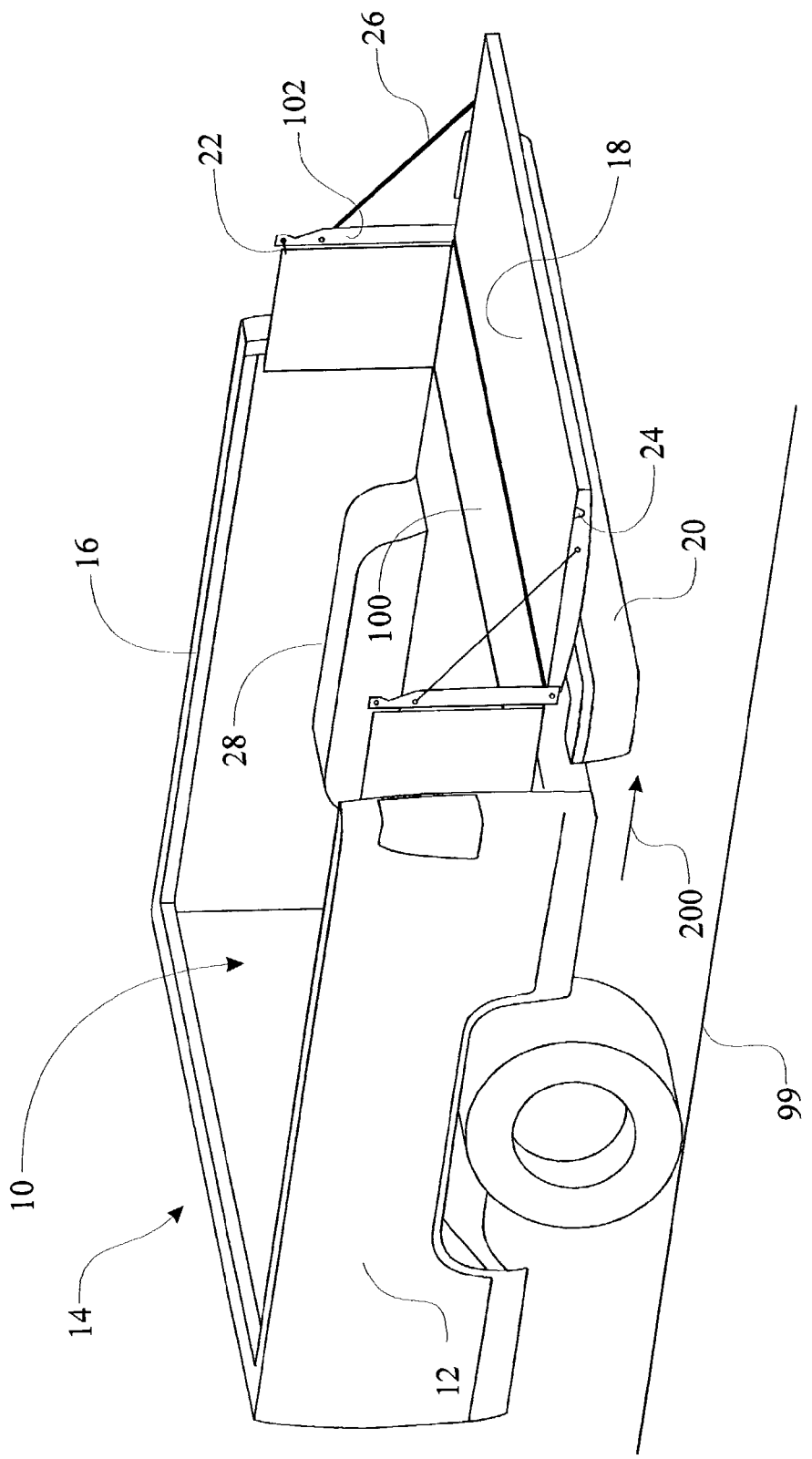
FIG. 3 is an isometric view of the pickup truck bed illustrating the present invention in an extended bed position with the tailgate in the lowered position.

FIG. 3 is an isometric view of the vehicle storage area 10 illustrating the present invention in an extended bed position with the vehicle tailgate 18 in a horizontal or lowered position. The present invention adjusts the horizontal positioning 200 of the vehicle tailgate 18 away from the storage area front wall 14 of the vehicle storage area 10. The horizontal positioning 200 of the operating mechanism horizontally positions the vehicle tailgate 18, rear bumper 20, and tailgate operations control post 102. The user can optionally secure the extension platform 100 to the operating mechanism of the present invention, providing a means to adjust the horizontal positioning 200 of the vehicle storage area extension platform 100. The extension platform 100 would horizontally adjust by sliding against the bottom of the vehicle storage area 10. It would be desired to install a protecting material (not shown) within the vehicle storage area 10, such as a bed-liner, carpet, and the like as a means for protecting the bottom of the vehicle storage area 10 against damaged from friction derived by the motion of the extension platform 100. By horizontal positioning 200 the present invention and positioning the vehicle tailgate 18 in the vertical or secured position, the user affectively increases the vehicle storage area 10 of the vehicle. Applicant will teach the preferred embodiment of a releasable coupling mechanism used to optionally couple the extension platform 100 to the operating mechanism (not shown) of the present invention.

Figure 4:
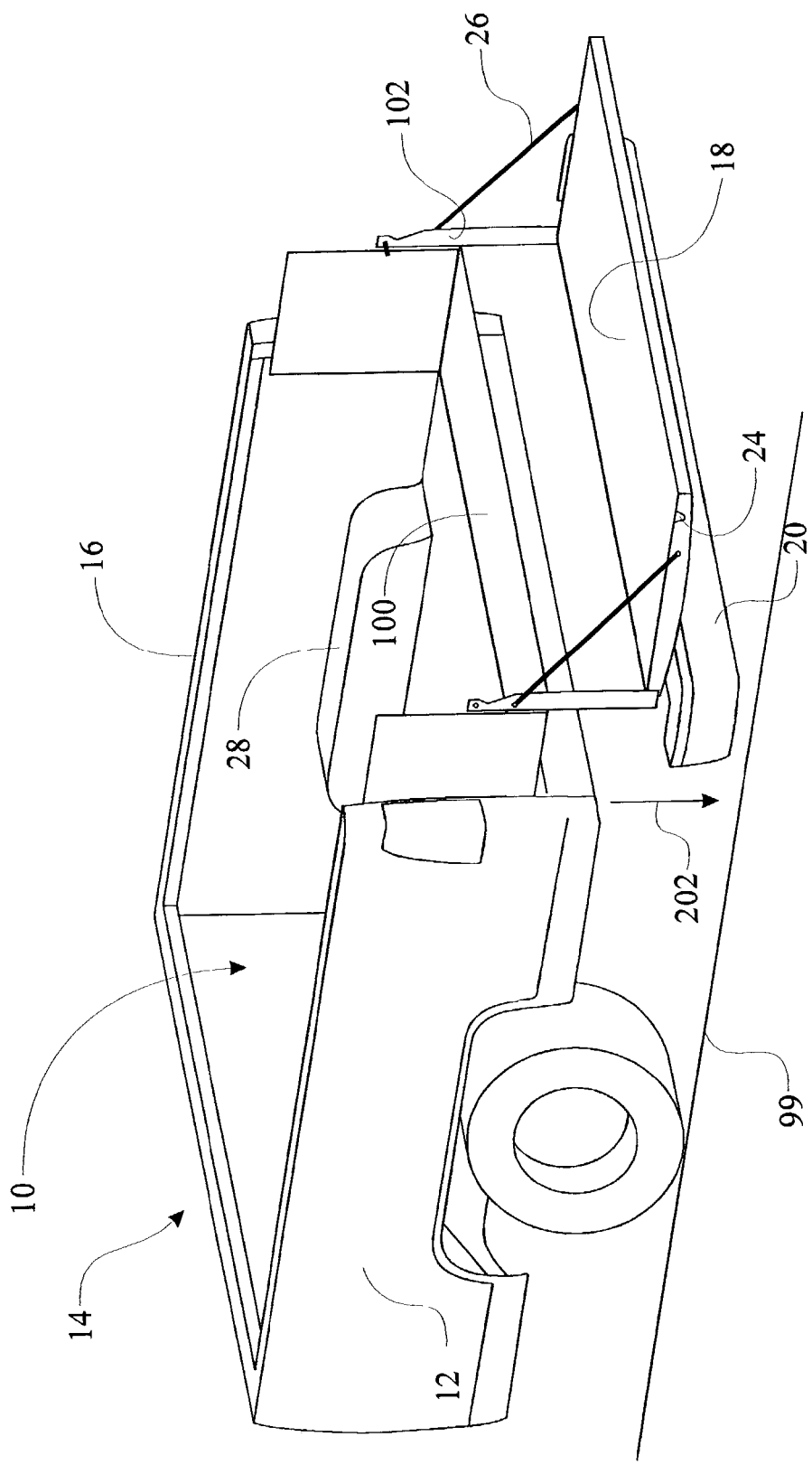
FIG. 4 is an isometric view of the pickup truck bed illustrating the present invention in a loading position with the tailgate in the lowered position.

FIG. 4 is an isometric view of the vehicle storage area 10 illustrating the present invention in a loading position with the vehicle tailgate 18 in a horizontal or lowered position. The present invention adjusts a vertical positioning 202 of the vehicle tailgate 18 against the ground level representation 99. A ground contacting member (not shown) maintains the position of the vehicle tailgate 18 and rear bumper 20 from directly contacting the ground and creating a step. The vertical positioning 202 of the operating mechanism vertically positions the vehicle tailgate 18, rear bumper 20, and tailgate operations control post 102. If the extension platform 100 is coupled to the present invention, the extension platform 100 remains in the extended bed position.

Figure 5:
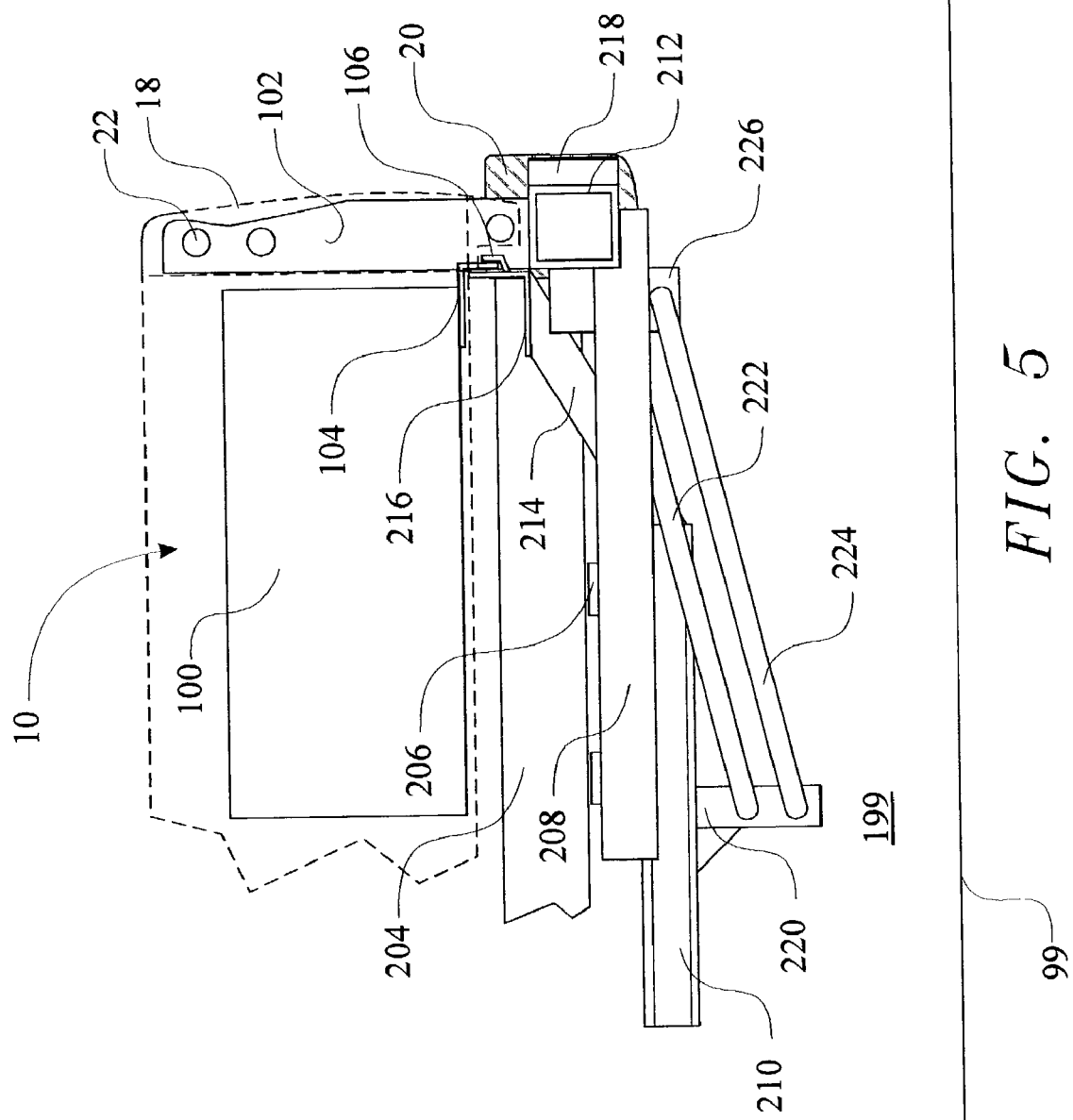
FIG. 5 is an elevation view of the operating mechanism of the present invention in the fully retracted position.

FIG. 5 is a side view of a stepgate operating mechanism 199 of the present invention in the fully retracted position. The operating mechanism would be contained within a stepgate subframe 208 that is mechanically coupled to a vehicle frame 204 using preferably two (2) or more vehicle mounting members 206. An extension frame 210 would be slideable coupled to the stepgate subframe 208. The stepgate subframe 208 would extend away from the vehicle storage area 10 by operating an extension piston (not shown in this figure). The extension platform 100 is removably coupled to the extension frame 210 by positioning an extension platform coupling bar 104 against an extension frame rear transverse member 216. The extension platform coupling bar 104 is further held in position by at least one extension platform coupling member 106. Additional details will be provided within this specification. The coupling mechanism shown is the preferred embodiment of the Applicant at the time of submission. It can be recognized that there are many known means to design removable coupling systems for this specific application. The extension frame rear transverse member 216 is coupled to the extension frame 210 by an extension frame riser member 214. The position of the extension frame rear transverse member 216 and the application of the extension frame riser member 214 provides a structure to position the extension frame coupling system against the rear of the vehicle storage area 10 and above the rear bumper 20.

FIG. 5 further illustrates a lifting section of the present invention. The lifting section is coupled to the extension frame 210 and adjusts in conjunction with the extension section of the present invention. The lifting section comprising a lifting control mechanism coupled to each side of the present invention, the lifting control mechanism comprising a front lift control frame member 220, an upper lift control member 222, an lower lift control member 224, and a rear lift control frame member 226. The upper lift control member 222 and lower lift control member 224 ensure the stepgate remains parallel during the vertical motion. The lifting control mechanism is coupled to the stepgate by a bumper and tailgate frame member 212 that is positioned perpendicular to the extension frame 210 of each side. Two (2) or more bumper mounting brackets 218 are coupled to the bumper and tailgate frame member 212 as a means to fasten the rear bumper 20 to the present invention. The tailgate operations control post 102 is coupled to the bumper and tailgate frame member 212, wherein the tailgate operations control post 102 positionally adjusts in conjunction with the motion of the present invention. The vehicle tailgate 18 is hingably coupled to the tailgate operations control post 102. A tailgate operations control post support bracket 110 is used to structurally support the tailgate operations control post 102, whereas the tailgate operations control post support bracket 110 is illustrated in a later figure. The motion of the operating mechanism of the present invention will be illustrated within the upcoming figures.

Figure 6:
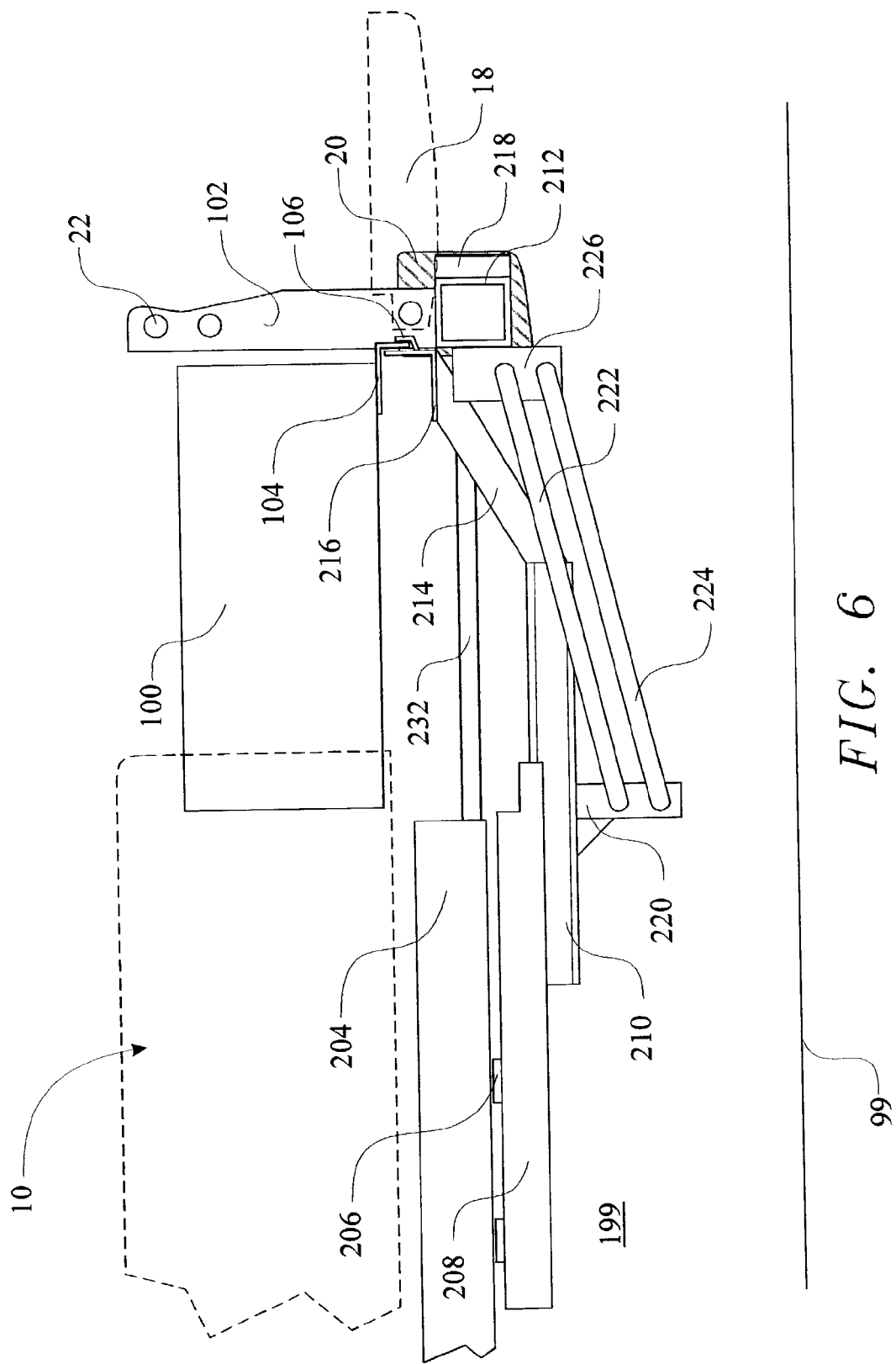
FIG. 6 is an elevation view of the operating mechanism of the present invention in the extended bed position.

FIG. 6 is a side view of the operating mechanism of the present invention in the extended bed position. The view illustrates the vehicle tailgate 18 in the horizontal position, wherein the vehicle tailgate 18 will be utilized as the stepgate for the present invention. An extension piston (partially shown within a later illustration) is coupled between the stepgate subframe 208 and the extension frame rear transverse member 216. When the extension piston is operated into the extended position, the extension piston positions the apparatus away from the vehicle storage area 10. If the extension platform 100 is coupled to the present invention, the extension platform 100 would be supported along one edge by the platform of the vehicle storage area 10 and along the second edge by the extension frame rear transverse member 216. During the extension process, the extension platform 100 would slide along the bottom of the vehicle storage area 10. The extension frame 210 is slideably coupled to the stepgate subframe 208 by design. The preferred embodiment of the present invention is the application of a "C" channel for use as stepgate subframe 208 and extension frame 210. An angle iron or "L" member (shown within a later illustration) is welded to the stepgate subframe 208 to create a channel which slideably couples the extension frame 210 to the stepgate subframe 208. The extension frame 210 is further held against the created channel by cross members (not shown).

Figure 7:
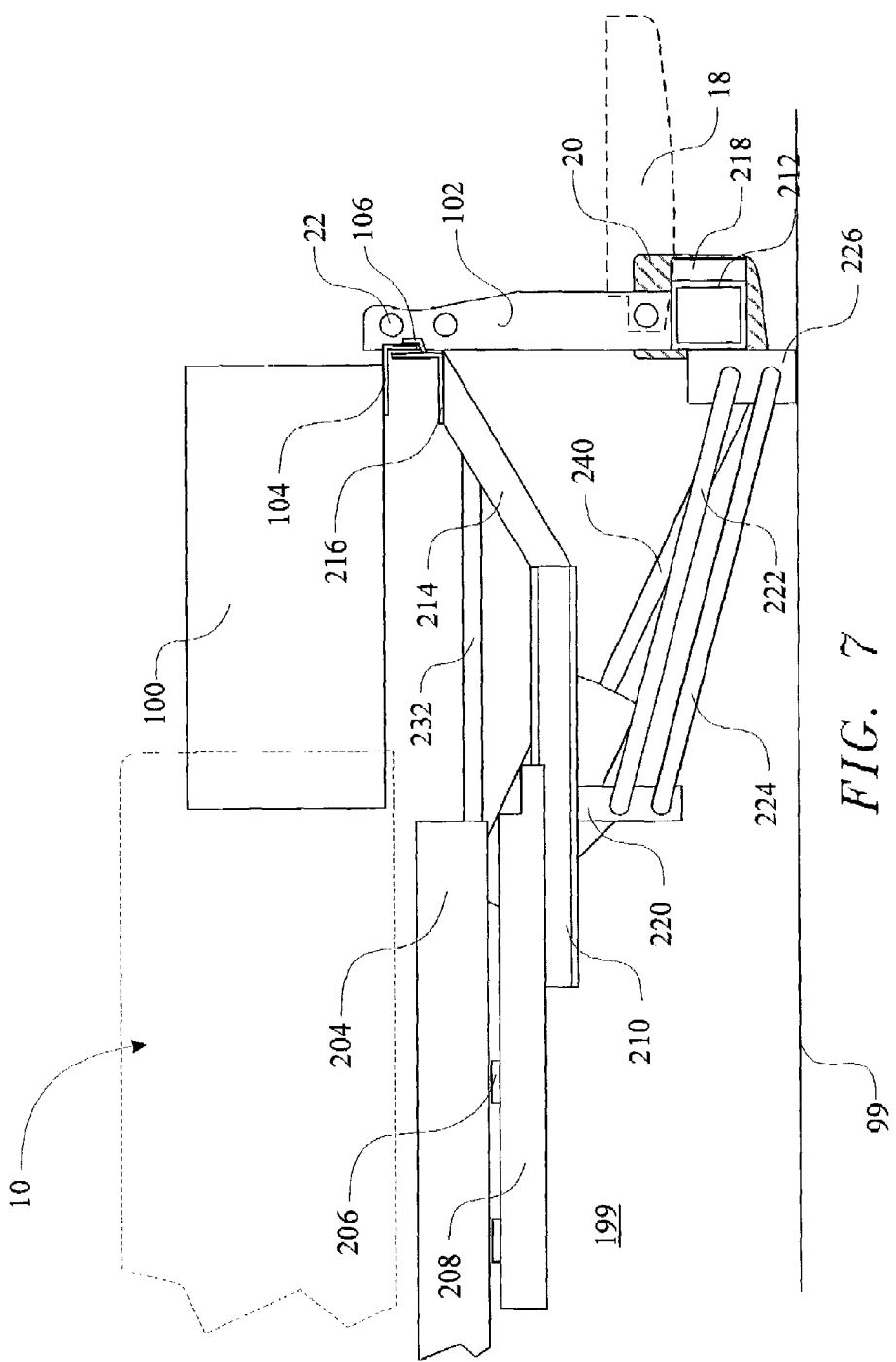
FIG. 7 is an elevation view of the operating mechanism of the present invention in the lowered position.

FIG. 7 is a side view of the operating mechanism of the present invention in the lowered position. The stepgate is lowered by extending a stepgate vertical motion piston 240. By extending the stepgate vertical motion piston 240, the stepgate vertical motion piston 240 causes the stepgate to lower. The stepgate is maintained in a horizontal position by the upper lift control member 222 and lower lift control member 224. The stepgate is lowered to the ground level representation 99, but is held above the ground level representation 99 by the position of the rear lift control frame member 226. The rear lift control frame member 226 is acting as the ground contacting member. The rear lift control frame member 226 is positioned such to maintain the vehicle tailgate 18 and rear bumper 20 from contacting the ground level representation 99. The vertical positioning 202 of the stepgate is independent of the horizontal positioning 200 of the stepgate and vehicle storage area extension platform 100. The Applicant has been using the present invention for evaluation purposes and the design as described herein has maintained a scratch-free vehicle tailgate 18 and rear bumper 20 since installation. Commonly known liftgates are designed for vertical motion, whereas the stepgate taught by the Applicant further includes a horizontal positioning 200 and subsequent increase in the contained area of the vehicle storage area 10. Commonly known liftgates are designed where the liftgate rests against the ground, disallowing the utilization of the vehicle tailgate 18 as the lifting platform, whereas the stepgate taught by the Applicant further includes a ground contacting member which maintains a distance between the ground and the bottomside of the vehicle tailgate 18.

Applicant furthers the capabilities of the present invention with the inclusion of ramps between the vehicle tailgate 18 and the ground level representation 99. Alternatively, the platform/lifting area of the stepgate can be increased by the inclusion of a folding section. The folding section would be hingeably coupled to the vehicle tailgate 18. Alternatively, the platform/lifting area of the stepgate can be increased by the inclusion of a sliding section. The sliding section would be slideably coupled to the vehicle tailgate 18.

Figure 8:
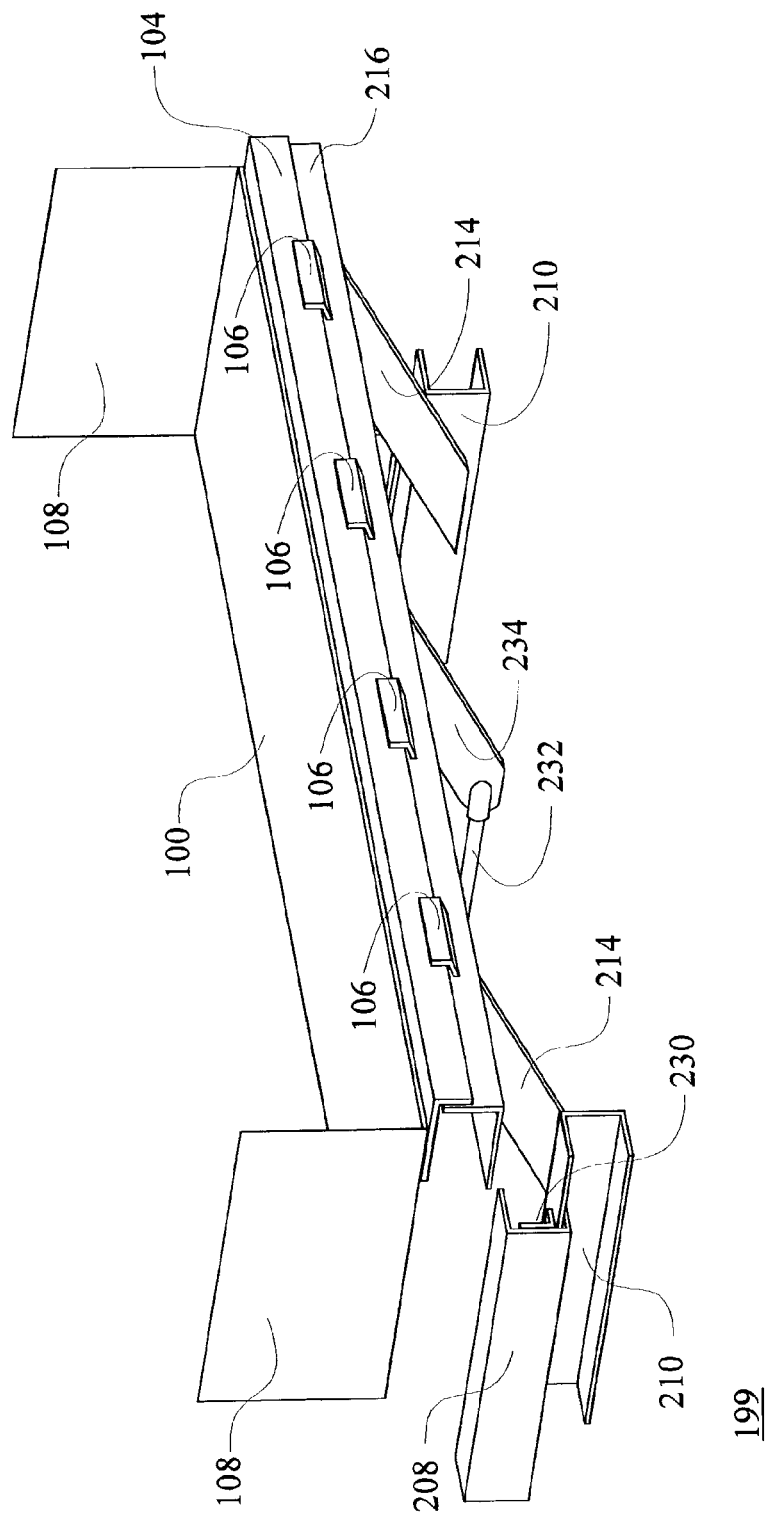
FIG. 8 is an isometric view of an extension section of the operating mechanism of the present invention.

FIG. 8 is an isometric view of an extension section of the stepgate operating mechanism 199 of the present invention. The illustration provides additional details that are not easily described by an elevation view. The extension platform coupling bar 104 is coupled to the base of the vehicle storage area extension platform 100, preferably by welding the two members together. At least one, but preferably a series of extension platform coupling member 106 would be coupled to the extension frame rear transverse member 216 preferably by welding the members together. The operator would place the extension platform coupling bar 104 between the extension frame rear transverse member 216 and the extension platform coupling member 106 if the operator would like to include the application of the extension platform 100 during the horizontal positioning 200 of the vehicle storage area extension platform 100. The horizontal positioning 200 would be accomplished when an extension piston 232 is pressurized and extends horizontal positioning 200 the extension platform 100 away from the vehicle storage area 10. The extension piston 232 is moveably coupled to the present invention by an extension piston mounting bracket 234; the extension piston mounting bracket 234 is coupled to the extension frame rear transverse member 216, preferably by welding the two members together. The opposing end of the extension piston 232 would be moveably coupled to at least one of the stepgate subframe 208 or the vehicle frame 204 (previously shown). It can be recognized that the extension piston 232 can alternatively be a screw drive system or other any other mechanism used to extend and retract over some distance, collectively referred to as an extension operating mechanism. The horizontal positioning 200 is controlled by the interlocking design of the extension frame 210. In the preferred embodiment, the stepgate subframe 208 and the extension frame 210 are of steel "C-channel" extrusions. In the preferred embodiment, the stepgate subframe extension support member 230 is of a steel, "L" shaped extrusion. The stepgate subframe extension support member 230 is coupled to the stepgate subframe 208, preferably by welding the two members together. The upper horizontal section of the extension frame 210 would be slideably contained between a lower horizontal section of the stepgate subframe 208 and the horizontal section of the stepgate subframe extension support member 230. The illustration further defines extension platform vertical member 108 of the vehicle storage area extension platform 100. The extension platform vertical member 108 stiffen the extension platform 100 as well as providing the additional containment within the vehicle storage area 10 when the horizontal positioning 200 of the present invention is in the extended position.

Figure 9:
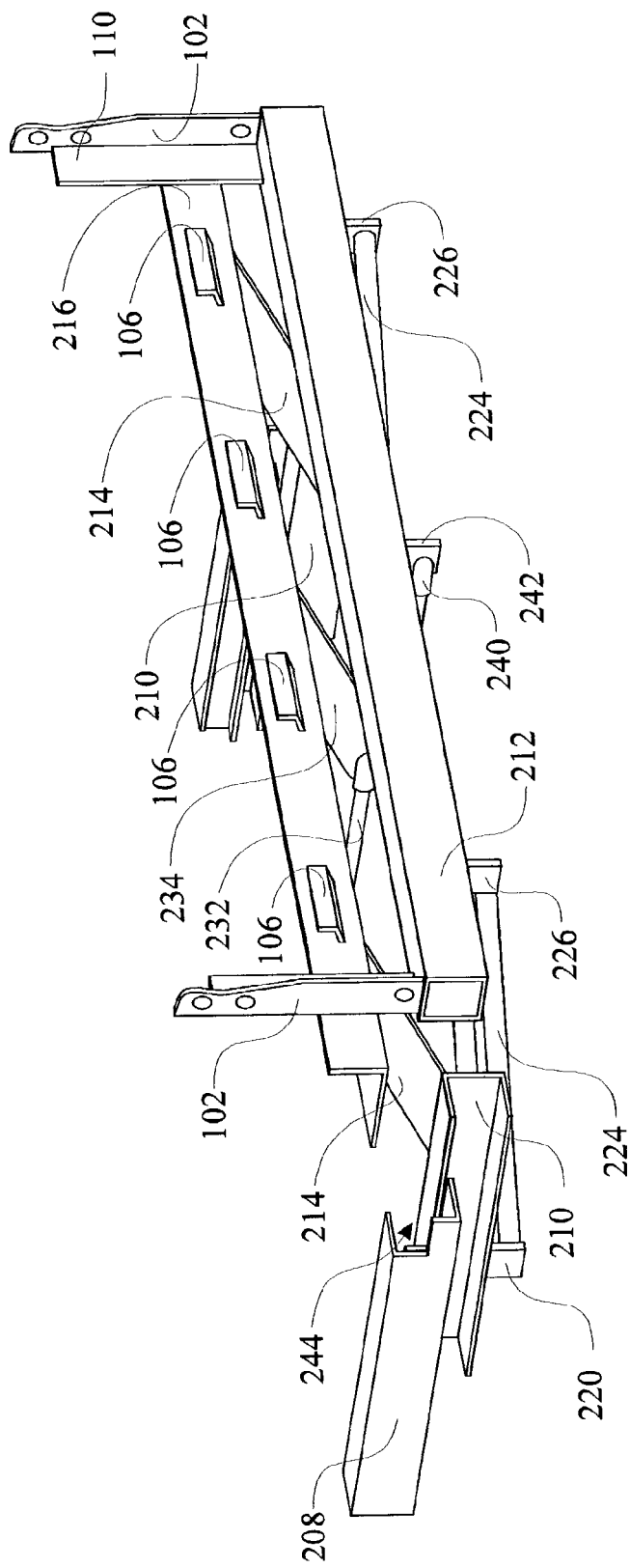
FIG. 9 is an isometric view of an extension and a lift section of the operating mechanism of the present invention shown in an extended position.

FIG. 9 is an isometric view of an extension section and a lift section of the operating mechanism of the present invention shown in an extended position. The illustration provides details to the lift section of the present invention. The lift section of the present invention comprising a front lift control frame member 220 which is coupled to the extension frame 210, preferably by welding the two members together; a rear lift control frame member 226 which is coupled to the bumper and tailgate frame member 212, preferably by welding the two members together; and the upper lift control member 222 and lower lift control member 224. The lift section of the present invention would be operated by pressurizing or de-pressurizing a stepgate vertical motion piston 240. The stepgate vertical motion piston 240 would be coupled to a stepgate vertical motion piston bracket 242 coupled to the bumper and tailgate frame member 212 positioned between the two extension frames 210. The stepgate vertical motion piston 240 would be positioned where it is not parallel to the upper lift control member 222 or lower lift control member 224. This will generate a rotational motion of the upper lift control member 222 and lower lift control member 224, to provide a vertical positioning 202 of the lift section of the present invention. The lift section further comprising the tailgate operations control post 102 coupled to the bumper and tailgate frame member 212, preferably by welding the two members together. A tailgate operations control post support bracket 110 is coupled to each of the tailgate operations control posts 102 and the bumper and tailgate frame member 212, preferably by welding the members together, as a means to strengthen the tailgate operations control post 102. The vehicle tailgate 18 (shown in an earlier illustration) is hingeably coupled to the tailgate operations control post 102. The tailgate operations control post support bracket 110 is positioned such to avoid interference with the vehicle tailgate 18, when the vehicle tailgate 18 is placed in the vertical or coupled position. The illustration provides a detail of a stepgate support notch 244, the bumper and tailgate frame member 212 rests within the stepgate support notch 244. The stepgate support notch 244 provides vertical support to the bumper and tailgate frame member 212 when the present invention is placed in the retracted position.

Figure 10:
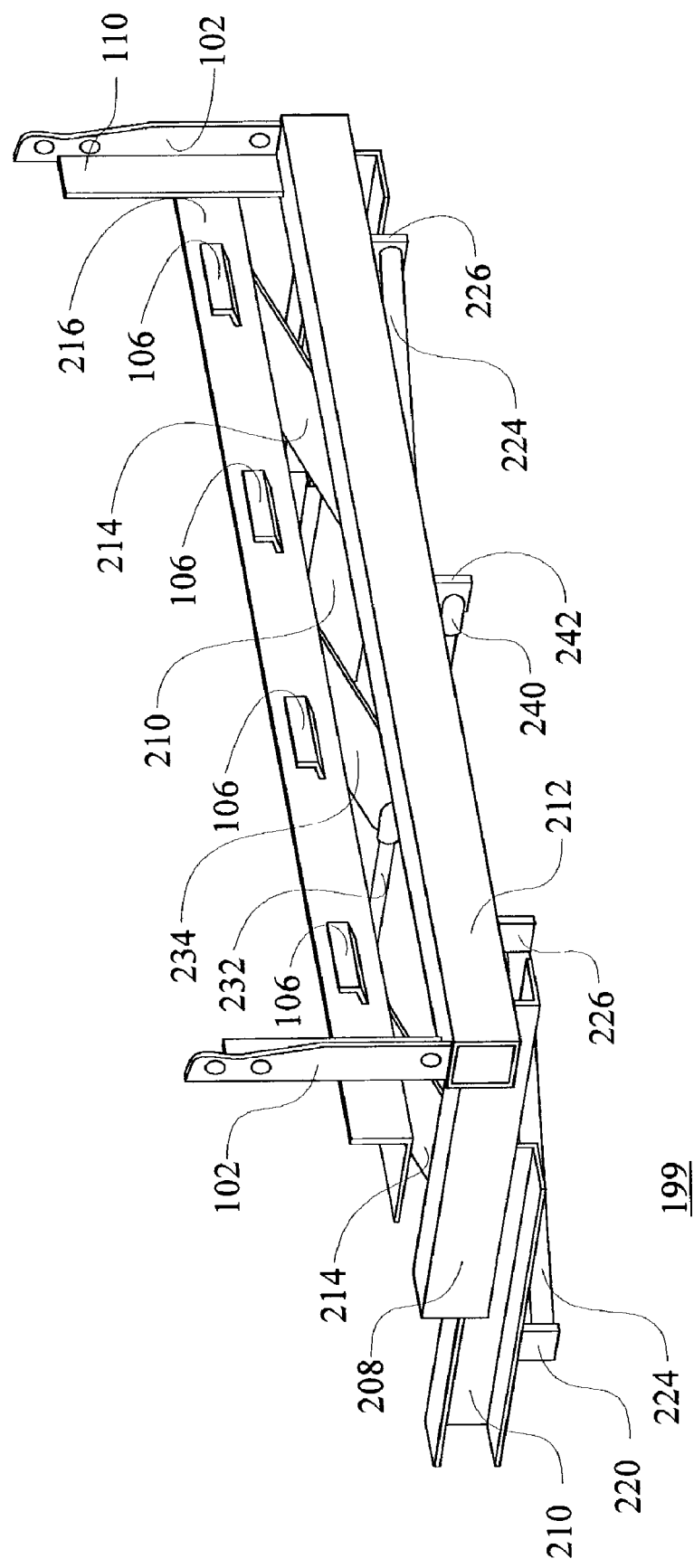
FIG. 10 is an isometric view of the extension and the lift section of the operating mechanism of the present invention shown in a retracted position.

FIG. 10 is an isometric view of the extension section and the lift section of the operating mechanism of the present invention shown in a retracted position. The illustration presents the respective positions of the stepgate subframe 208 and the extension frame 210 when the present invention is positioned in the retracted position. The bumper and tailgate frame member 212 is placed into the stepgate support notch 244.

The teachings herein depict the preferred embodiment of the present invention. It can be recognized that although the illustration and specification specifically describes the incorporation of a stepgate operating mechanism as described herein, alternative operating mechanism designs, such as slide bearings, different channels, and the like can be utilized while maintaining the spirit and intent of the present invention.

What is claimed is:

1. A stepgate comprising:
an extension frame designed to be coupled to a vehicle frame,
a stepgate subframe, wherein the stepgate subframe and the extension frame are slideably coupled together,
an extension platform positioned above the vehicle frame,
an extension operating mechanism used to horizontally position the extension platform,
and an extension platform coupling mechanism for coupling said extension platform in a manner to move said extension platform parallel to the vehicle frame in conjunction with the motion of the stepgate subframe.

2. The stepgate of claim 1, wherein the extension platform coupling mechanism allows the extension platform to be removable.

3. The stepgate of claim 2, the stepgate further comprising an extension frame rear transverse member, wherein the extension platform coupling mechanism comprising an extension platform coupling tab coupled to the extension platform and an extension platform coupling receptacle coupled to the extension frame rear transverse member.

4. The stepgate of claim 1, the stepgate further comprising a lifting section for lifting objects from the ground to the extension platform.

5. The stepgate of claim 4, wherein the lifting section utilizes a vehicle tailgate as a lifting platform, wherein said vehicle tailgate is at least one of a factory vehicle tailgate or a factory vehicle tailgate facsimile.

6. The stepgate of claim 4, the stepgate further comprising a stepgate subframe,
and the lifting section further comprising a lifting section rear transverse member,
wherein the stepgate subframe comprising a stepgate support notch for providing support to a lifting section rear transverse member.

7. A stepgate comprising:
a stepgate subframe,
an extension subframe slideably coupled to the stepgate subframe providing linear motion between said extension subframe and stepgate subframe,
an extension platform slideably coupled to the extension subframe,
a lifting section comprising a lifting platform, wherein the lifting section is moveably coupled to the extension subframe in a manner whereby the lifting section can vertically change the position of the lifting platform, and
wherein the lifting section further comprising a tailgate operations control post and a vehicle tailgate, wherein the tailgate operations control post hingably couples the vehicle tailgate to the lifting section of the stepgate.

8. The stepgate of claim 7 further comprising a lifting platform extension member which couples to the vehicle tailgate to provide a larger lifting surface area.

9. The stepgate of claim 7 wherein the stepgate further comprises a footing member used to contact a ground, wherein the footing member ensures the vehicle tailgate avoids contact with the ground when the ground is parallel to the tailgate.

10. A stepgate comprising:
a stepgate subframe,
an extension subframe slideably coupled to the stepgate subframe providing linear motion between said extension subframe and stepgate subframe,
an extension platform slideably coupled to the extension subframe,
a lifting section comprising a lifting platform, wherein the lifting section is moveably coupled to the extension subframe in a manner whereby the lifting section can vertically change the position of the lifting platform, and
the stepgate further comprising a removable extension platform, wherein the removable extension platform is removably coupled to the extension subframe in a manner wherein the removable extension platform is supported on a first end by a storage platform of a vehicle and supported on a second end by the extension subframe and moves horizontally in conjunction with a horizontal motion of the extension subframe.

* * * * *